J. M. JACKMAN.
Milk-Coolers.

No. 150,473.

Patented May 5, 1874.

Attest.

Inventor.

UNITED STATES PATENT OFFICE.

JOHN M. JACKMAN, OF BARRE, VERMONT.

IMPROVEMENT IN MILK-COOLERS.

Specification forming part of Letters Patent No. 150,473, dated May 5, 1874; application filed February 26, 1874.

*To all whom it may concern:*

Be it known that I, JOHN M. JACKMAN, of Barre, in the county of Washington and State of Vermont, have invented certain new and useful Improvements in Vessels for Milk and Cream; and I do hereby declare the following to be a full, clear, and exact description of the invention, such as will enable others skilled in the art to which it pertains to make and use it, reference being had to the accompanying drawings, which form part of this specification.

This invention relates to that class of devices used by dairymen for the purpose of keeping milk and cream at any desired temperature; and consists in placing the receptacle for milk or cream within an outer casing, and arranging a perforated water-pipe in such manner that a shower of spray may be thrown upon it, and in other details of construction, as will be hereinafter fully described, and then pointed out in the claims.

In the accompanying drawings similar letters indicate corresponding parts in the different figures.

Figure 1:
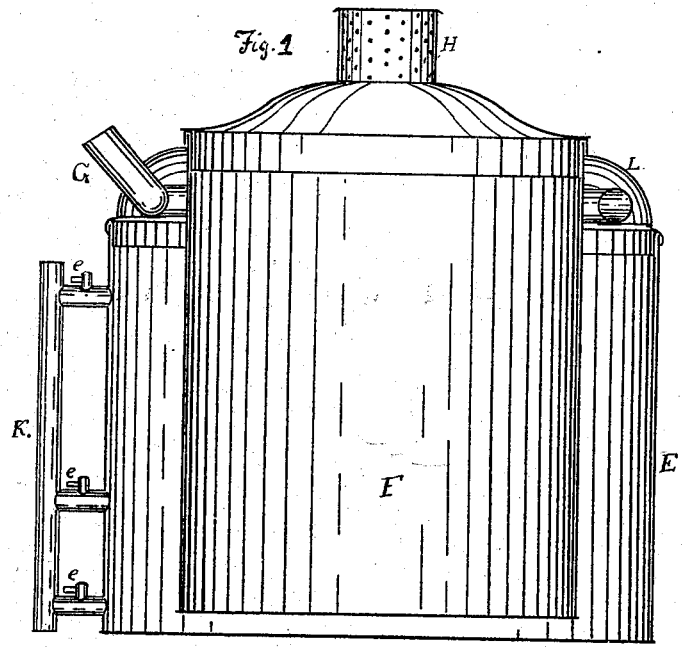
Figure 2:
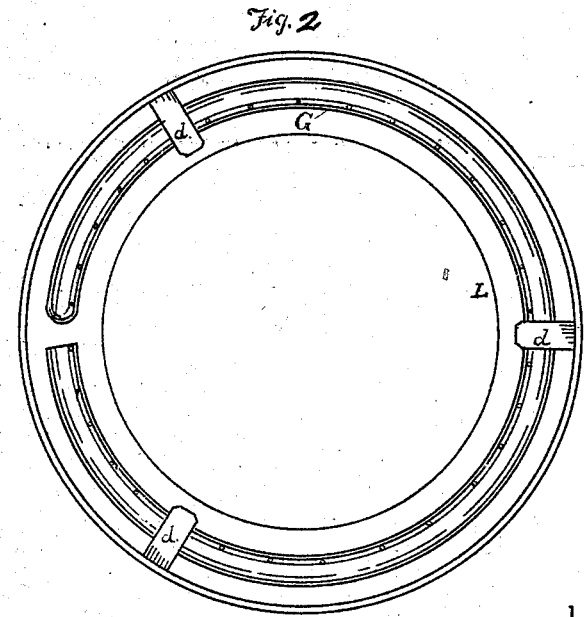

Figure 1 represents a vertical section through the milk-receptacle, its ventilating-cover, the outer case, and its pipe-carrying cap. Fig. 2 is a plan of the cap reversed, showing the position of the perforated water-pipe.

The can or milk-receptacle F is of any convenient form, but I prefer the cylindrical one shown in the drawings, as being more conveniently moved about from place to place, and affording a large amount of surface upon which the spray falls during the act of cooling its contents. It is provided with a close-fitting cover having a cylindrical perforated ventilator, H, attached to its upper surface, which allows at all times a free circulation of air within the can. An outer casing, E, corresponding in shape to the can F, but larger, is provided with a side pipe, K, to which it is connected by means of three or more stop-cocks, $e$. The pipe K, being open at its lower end, enables the operator, through the agency of the stop-cocks, to keep the water within the case E at any desired height around the inner can; or, if the lower one be left open, the water will all pass out, leaving the whole surface of the receptacle exposed to the action of spray falling from the perforated pipe G. This pipe encircles the upper part of the receptacle, being supported by, and partially inclosed within, an annular cap, L, which rests upon the top of the casing E, and in its turn supports the receptacle F. One end of the pipe G passes upward through an orifice in the cap, and is connected with a reservoir of water; or a funnel may be inserted and the water poured in as wanted. In order to render the pipe accessible at all times for the purpose of cleaning it, as well as the inner side of the cap, it is so constructed as to be readily removed, when desired, by simply springing back the catches $d$, when the whole coil may be removed from the cap, the cleaning process performed, and the coil replaced.

Having thus described my invention, I claim as new, and desire to secure by Letters Patent, the following:

1. The cap L, provided with the perforated pipe G, and arranged as described, so as to throw water against the sides of the milk-receptacle F, substantially as and for the purpose set forth.

2. The milk or cream cooler, herein described, consisting of the inner and outer vessels F E, the cap L, with its perforated pipe, the cover having the ventilator H, and the water-outlet pipes $e$ and K, arranged and combined substantially as specified.

In testimony that I claim the foregoing I have hereunto set my hand.

JOHN M. JACKMAN.

Witnesses:
  O. H. REED,
  E. E. FRENCH.